(12) United States Patent
Shalev et al.

(10) Patent No.: US 12,079,629 B2
(45) Date of Patent: Sep. 3, 2024

(54) SCORE PREDICTION USING HIERARCHICAL ATTENTION

(71) Applicant: Intuit Inc., Mountain View, CA (US)

(72) Inventors: Adi Shalev, Herzliya (IL); Nitzan Gado, Hod Sharon (IL); Talia Tron, Hod Hasharon (IL); Alexander Zhicharevich, Petah Tikva (IL)

(73) Assignee: Intuit Inc., Mountain View, CA (US)

( * ) Notice: Subject to any disclaimer, the term of this patent is extended or adjusted under 35 U.S.C. 154(b) by 466 days.

(21) Appl. No.: 17/390,660

(22) Filed: Jul. 30, 2021

(65) Prior Publication Data

US 2023/0034085 A1  Feb. 2, 2023

(51) Int. Cl.
G06F 16/907 (2019.01)
G06F 9/30 (2018.01)
G06F 18/214 (2023.01)
G06F 40/00 (2020.01)
G06F 40/126 (2020.01)
G10L 25/30 (2013.01)

(52) U.S. Cl.
CPC ...... *G06F 9/30156* (2013.01); *G06F 9/30036* (2013.01); *G06F 16/907* (2019.01); *G06F 18/2155* (2023.01); *G06F 40/00* (2020.01); *G06F 40/126* (2020.01); *G10L 25/30* (2013.01)

(58) Field of Classification Search
None
See application file for complete search history.

(56) References Cited

U.S. PATENT DOCUMENTS

| | | | |
|---|---|---|---|
| 2015/0195406 A1* | 7/2015 | Dwyer | G10L 15/02 379/265.07 |
| 2020/0195779 A1* | 6/2020 | Weisman | G06N 5/01 |
| 2023/0027526 A1* | 1/2023 | Kim | G06F 18/22 |

OTHER PUBLICATIONS

Yang, Z. et al., "Hierarchical Attention Networks for Document Classification", Proceedings of the 2016 Conference of the North American Chapter of the Association for Computational Linguistics; Jun. 12-17, 2016; pp. 1480-1489 (10 pages).

* cited by examiner

Primary Examiner — Nicole A K Schmieder
(74) Attorney, Agent, or Firm — Lathrop GPM LLP

(57) ABSTRACT

A method of score prediction uses hierarchical attention. Word features, positioning features, participant embedding features, and metadata are extracted from a transcript of a conversation. A word encoder vector is formed by multiplying weights of a word encoder layer to one or more word features. A sentence vector is formed by multiplying weights of a word attention layer to word encoder vectors. An utterance encoder vector is formed by multiplying weights of an utterance encoder layer to the sentence vector. A conversation vector is formed by multiplying weights of an utterance attention layer to utterance encoder vectors. The utterance encoder vector is combined with one or more positioning features and one or more participant embedding features. A predicted net promoter score is generated by multiplying weights of an output layer to the conversation vector combined with the metadata. The predicted net promoter score is presented in a list of conversations.

19 Claims, 6 Drawing Sheets

FIGURE 4

SCORE PREDICTION USING HIERARCHICAL ATTENTION

BACKGROUND

The net promoter score (NPS) is a metric that identifies the willingness of a person to be a "promoter" and recommend products or services to other people. A transactional net promoter score (tNPS) is a type of net promoter score that focuses on willingness after a specific transaction. Transactional net promoter scores may be generated with surveys after calls into a call center to provide a metric of the effectiveness of the call center for addressing the calls into the call center. A challenge is that not every caller takes a survey.

SUMMARY

In general, in one or more aspects, the disclosure relates to a method of score prediction using hierarchical attention. Word features, positioning features, participant embedding features, and metadata are extracted from a transcript of a conversation. A word encoder vector is formed by multiplying weights of a word encoder layer to one or more word features. A sentence vector is formed by multiplying weights of a word attention layer to word encoder vectors. An utterance encoder vector is formed by multiplying weights of an utterance encoder layer to the sentence vector. A conversation vector is formed by multiplying weights of an utterance attention layer to utterance encoder vectors. The utterance encoder vector is combined with one or more positioning features and one or more participant embedding features. A predicted net promoter score is generated by multiplying weights of an output layer to the conversation vector combined with the metadata. The predicted net promoter score is presented in a list of conversations.

In general, in one or more aspects, the disclosure relates to a system with a hierarchical attention model and a server application. The hierarchical attention model includes a word level model and an utterance level model. The server application executes on one or more servers with the hierarchical attention model. Word features, positioning features, participant embedding features, and metadata are extracting from a transcript of a conversation. A word encoder vector is formed by multiplying weights of a word encoder layer of the word level model to one or more word features. A sentence vector is formed by multiplying weights of a word attention layer of the word level model to word encoder vectors. An utterance encoder vector is formed by multiplying weights of an utterance encoder layer of the utterance level model to the sentence vector. A conversation vector is formed by multiplying weights of an utterance attention layer of the utterance level model to utterance encoder vectors. The utterance encoder vector is combined with one or more positioning features and one or more participant embedding features. A predicted net promoter score is generated by multiplying weights of an output layer to the conversation vector combined with the metadata. The predicted net promoter score is presented in a list of conversations.

In general, in one or more aspects, the disclosure relates to a method of training a machine learning model. A hierarchical attention model is trained to generate the predicted net promoter score from a transcript. Training scores are formed from training transcripts. Word features, positioning features, participant embedding features, and metadata are extracted, from a transcript of a conversation. A word encoder vector is formed by multiplying weights of a word encoder layer to one or more word features. A sentence vector is formed by multiplying weights of a word attention layer to word encoder vectors. An utterance encoder vector is formed by multiplying weights of an utterance encoder layer to the sentence vector. A conversation vector is formed by multiplying weights of an utterance attention layer to utterance encoder vectors. The utterance encoder vector is combined with one or more positioning features and one or more participant embedding features. A predicted net promoter score is generated by multiplying weights of an output layer to the conversation vector combined with the metadata. The training scores include the predicted net promoter score. The training scores are compared to transcript labels to form updates. The hierarchical attention model is updated with the updates.

Other aspects of the invention will be apparent from the following description and the appended claims.

BRIEF DESCRIPTION OF DRAWINGS

FIG. 3 and FIG. 4 show examples in accordance with disclosed embodiments.

DETAILED DESCRIPTION

Figure 1A:
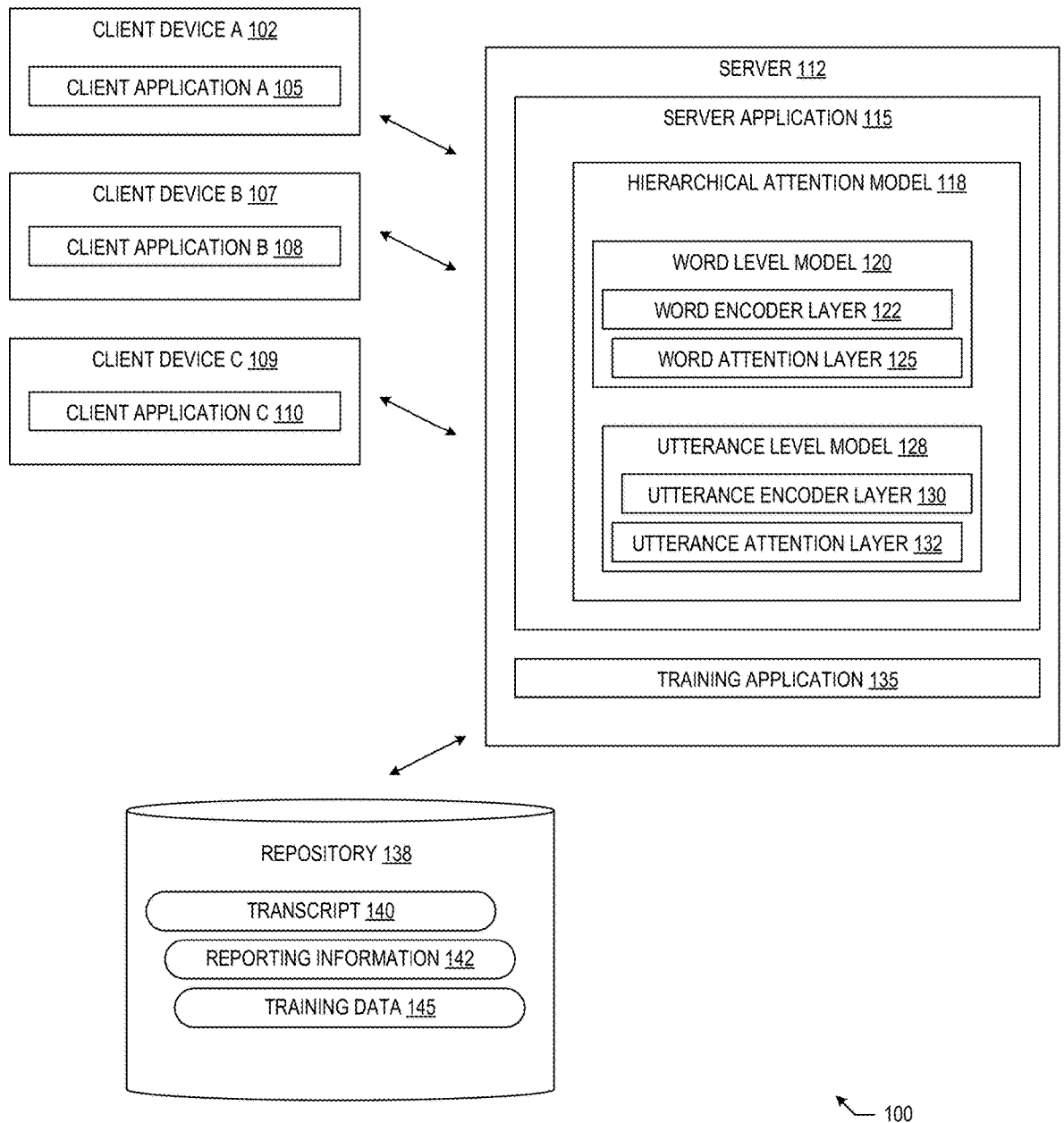
FIG. 1A and FIG. 1B show diagrams of systems in accordance with disclosed embodiments.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In general, a common scenario within the customer service industry is for a customer to call into a call center to discuss issues with an expert. Following a discussion with the expert, a customer satisfaction survey may be administered for about 10% of the calls into a call center, which may not provide enough data to identify strong or weak experts (i.e., that properly (or improperly) handle calls with customers, that have adequate expertise, etc.).

Systems in accordance with the disclosure generate a dynamic transactional net promoter score (DtNPS) (also referred to as a predicted net promoter score) for each call into a call center using machine learning models. The dynamic transactional net promoter score is generated as a proxy to the tNPS score that would have been generated if a customer had completed the survey. The dynamic transactional net promoter score can be generated as soon as a contact (a call) is completed to provide real time feedback on the effectiveness of the experts and the call center as a whole. In one embodiment, a net promoter score is a numeric value from 0 to 10. Scores from 0 to 6 may be identified as "detractors". Scores from 7 to 8 may be identified as "neutral". Scores from 9 to 10 may be identified as "promoters". Based on these scores, changes may be made to the call center or expert status (e.g., modifications to the call center management or processes, adjustments to the status or ranking of the experts, etc.). Stated differently, in one embodiment, the operations of the call center are improved based on the net promoter score. The score may be tied to the products (e.g., tax preparation software and services) offered by a company and used by the customer.

In certain embodiments of the disclosure, the machine learning model of the system extracts features from transcripts of the call, which are fed into a hierarchical attention model. The hierarchical attention model includes a word level model that feeds into an utterance level model. The word level model processes the words of a conversation and the utterance level model processes the utterances (e.g., sentences) of a conversation. Further, the word level model and the utterance level model each have encoder and attention layers. The encoder layers identify the context of a set of words or utterances. The attention layers identify relevant words and utterances within the sets of words and utterances. The output of the utterance level model is used to generate a predicted net promoter score that identifies whether the customer is a "promoter", "neutral", or a "detractor".

Figure 1B:
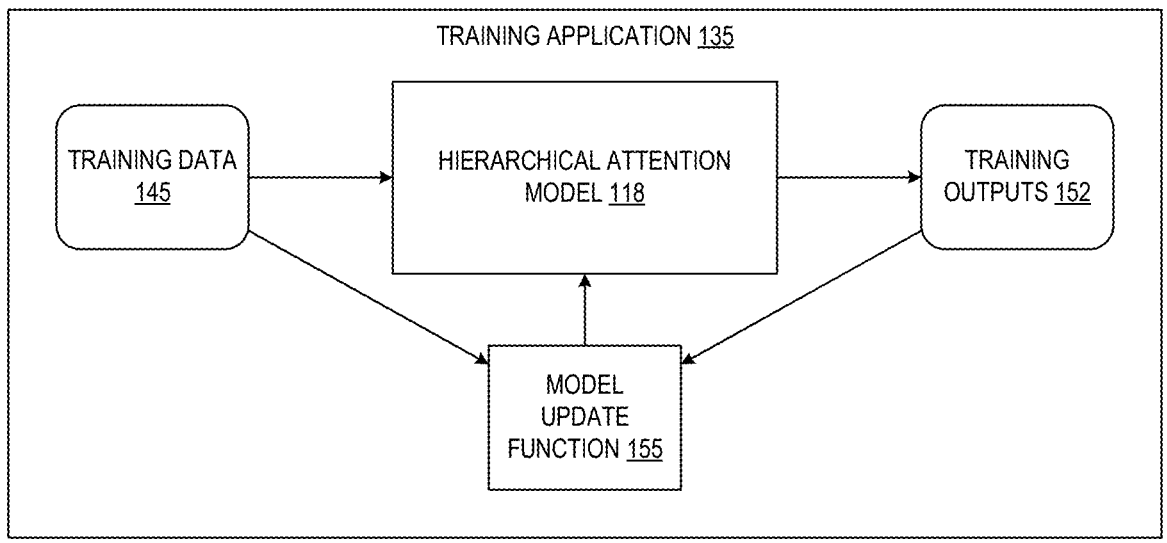

FIGS. 1A and 1B, show diagrams of embodiments that are in accordance with the disclosure. FIG. 1A shows a diagram of the system (100) that implements score prediction using hierarchical attention. FIG. 1B shows a diagram of the training application (135). The embodiments of FIGS. 1A and 1B may be combined and may include or be included within the features and embodiments described in the other figures of the application. The features and elements of FIGS. 1A and 1B are, individually and as a combination, improvements to machine learning technology and computing systems. The various elements, systems, and components shown in FIGS. 1A and 1B may be omitted, repeated, combined, and/or altered as shown from FIGS. 1A and 1B. Accordingly, the scope of the present disclosure should not be considered limited to the specific arrangements shown in FIGS. 1A and 1B.

Turning to FIG. 1A, the system (100) predicts net promoter scores using hierarchical attention to identify whether a user of the system (100) (also referred to as a customer) will promote further use of the system (100) to improve operations of a call center. The system (100) includes the client device A (102), the client device B (107), the client device C (109), the server (112), and the repository (138). While depicted using a client server architecture, embodiments of the system (100) may be implemented on a single computing system.

Figure 5A:
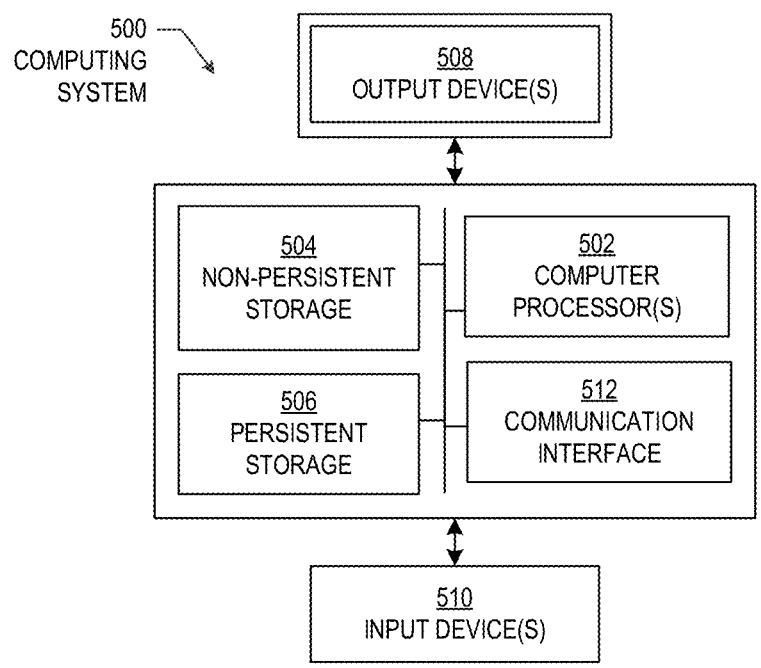
FIG. 5A and FIG. 5B show computing systems in accordance with disclosed embodiments.

The client devices A (102), B (107), and C (109) are computing systems (further described in FIG. 5A). For example, the client devices A (102), B (107), and C (109) may be desktop computers, mobile devices, laptop computers, tablet computers, etc. The client devices A (102), B (107), and C (109) respectively include the client application A (105), the client application B (108), and the client application C (110). In one embodiment, the client device A (102) may be used by a customer to contact a call center serviced by the server (112). In one embodiment, the client device B (107) may be used by an expert to discuss an issue with the customer using the client device A (102). In one embodiment, the client device C (109) may be used by a manager to monitor the net promoter scores of the customers that interact with the expert using the client device B (107).

The client application A (105), the client application B (108), and the client application C (110) may each include multiple programs respectively running on the client devices A (102), B (107), and C (109). The client application A (105) is operated by user and may access the server application (115) for a call to the client application B (108), which may be recorded to the repository (138) and stored as the transcript (140). The client application C (110) may access a report generated by the server application (115) that includes the predicted net promoter score for the call between the users of the client devices A (102) and B (107).

The server (112) is a computing system (further described in FIG. 5A). The server (112) may include multiple physical and virtual computing systems that form part of a cloud computing environment. In one embodiment, execution of the programs and applications of server (112) is distributed to multiple physical and virtual computing systems in the cloud computing environment. In one embodiment, the server (112) includes the server application (115) and the training application (135).

The server application (115) is a collection of programs that may execute on the server (112). In one embodiment, the server application (115) hosts a call between the client application A (105) and the client application B (108). In one embodiment, the server application (115) hosts a website accessed by the client application C (110). The server application (115) generates the reporting information (142) from the transcript (140) using the hierarchical attention model (118). The server application (115) includes the hierarchical attention model (118).

The hierarchical attention model (118) is a set of programs running as part of the server application (115). The hierarchical attention model (118) generates a prediction of a promoter category ("promoter", "neutral", or a "detractor") from the words of a conversation stored as the transcript (140) in the repository (138). The hierarchical attention model (118) includes the word level model (120) and the utterance level model (128).

The word level model (120) analyzes the words of a conversation to generate sentence vectors from word embeddings extracted from the transcript of an application. In one embodiment, the word level model (120) is a neural network that includes the word encoder layer (122) and the word attention layer (125).

The word encoder layer (122) encodes the words of a conversation. In one embodiment, the word encoder layer (122) includes a bidirectional recurrent neural network (BRNN). Bidirectional recurrent neural networks connect two hidden neural network layers of opposite directions to the same output. The output layer may utilize information from past (backwards) and future (forward) states simultaneously. In one embodiment, a bidirectional recurrent neural network includes the neurons of two recurrent neural networks that are biased in two directions, one for positive time direction (forward states), and the other for negative time direction (backward states). The forward state outputs are not connected to the backward state inputs and vice versa. In one embodiment, the bidirectional recurrent neural network is a bidirectional long short-term memory (bi-LSTM).

The word attention layer (125) identifies relative importance of the words of an utterance (i.e., sentence). Attention layers in neural networks mimic cognitive attention to enhance certain parts of the input data and attenuate the rest. The parts enhance or attenuate depends on context and is learned through training with gradient descent.

The utterance level model (128) analyzes the utterances (i.e., sentences) of a conversation to generate a conversation vector from the sentence vectors from the word level model (120). The utterance level model (128) has a similar architecture to the word level model (120). In one embodiment, the utterance level model (128) is a neural network that includes the utterance encoder layer (130) and the utterance attention layer (132).

The utterance encoder layer (130) encodes the utterances from the conversation. In one embodiment, the utterance encoder layer (130) includes a bidirectional recurrent neural network (BRNN).

The utterance attention layer (132) identifies relative importance of the sentences of a conversation. The input to utterance attention layer (132) includes the output from the utterance encoder layer.

The training application (135) is a collection of programs that may execute on the server (112). The training application (135) trains the machine learning models used by the system (100) using the training data (145). The training application (135) is further described with FIG. 1B.

The repository (125) is a computing system that may include multiple computing devices in accordance with the computing system (500) and the nodes (522) and (524) described below in FIGS. 5A and 5B. The repository (125) may be hosted by a cloud services provider that also hosts the server (112). The cloud services provider may provide hosting, virtualization, and data storage services as well as other cloud services and to operate and control the data, programs, and applications that store and retrieve data from the repository (125). The data in the repository (125) includes the transcript (140), the reporting information (142), and the training data (145).

The transcript (140) is an electronic file. In one embodiment, the transcript (140) that stores the words of a conversation between a customer and an expert.

The reporting information (142) is generated by the system (100) in response to processing the transcript using the hierarchical attention model (118). In one embodiment, the reporting information (142) includes a predicted net promoter score generated from the transcript (140).

The training data (145) is the data used to train the hierarchical attention model (118) of the system (100). The training data may include training inputs and labels for supervised training. In one embodiment, the training data includes historical transcripts and the survey ratings that identify the transactional net promoter scores for the historical transcripts. The training data (145) may be continuously updated with new transcripts and survey ratings that are used to train and retrain the hierarchical attention model (118).

Turning to FIG. 1B, the training application (135) trains the hierarchical attention model (118). The hierarchical attention model (118) uses the training data (145) and the model update function (155) to train the hierarchical attention model (118).

The training data (145) includes historical transactions and labels for the historical transactions. The labels are the transactional net promoter scores from the surveys taken after the conversations of the historical transcripts.

The training data (145) is input to the hierarchical attention model (118). The hierarchical attention model (118) generates the training outputs (152) from the historical transcripts from the training data (145). In one embodiment, the training outputs (152) include net promoter scores for the historical transcripts from the training data (145).

The model update function (155) updates the hierarchical attention model (118) based on the training outputs (152). In one embodiment, the model update function (155) uses supervised learning to compares the training outputs (152) with labels from the training data (145). The comparison may use an error function that identifies the difference between the training outputs (152) and the labels from the training data (145). Backpropagation may be used to adjust the weights in the hierarchical attention model (118) based on the comparisons between the training outputs (152) and the labels from the training data (145).

Figure 2:
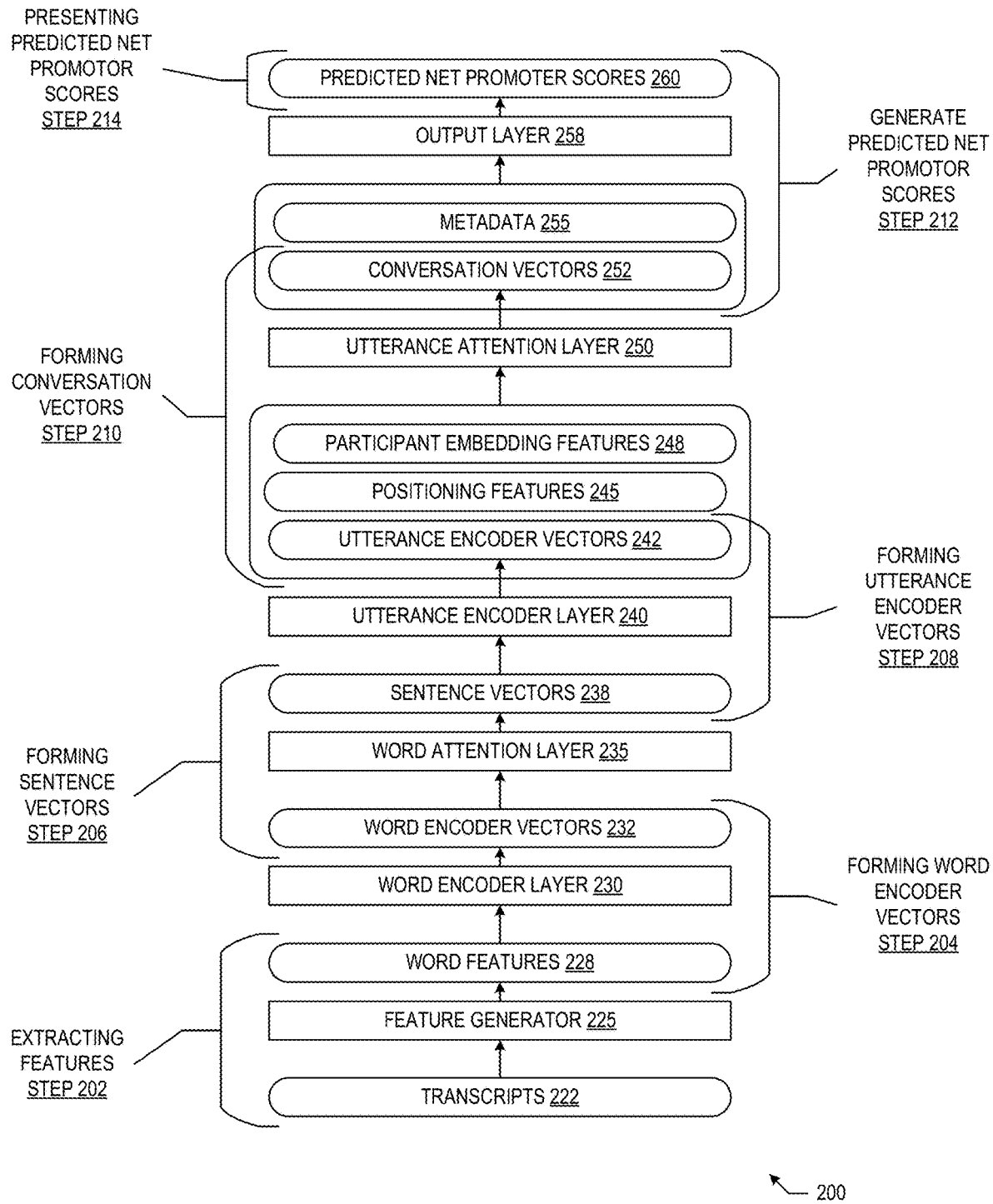
FIG. 2 shows a data flowchart in accordance with disclosed embodiments.

FIG. 2 shows data flowchart of predicting transactional net promoter scores from transcripts in accordance with the disclosure. The embodiments of FIG. 2 may be combined and may include or be included within the features and embodiments described in the other figures of the application. The features of FIG. 2 are, individually and as an ordered combination, improvements to machine learning technology and computing systems. While the various steps in the flowcharts are presented and described sequentially, one of ordinary skill will appreciate that at least some of the steps may be executed in different orders, may be combined or omitted, and at least some of the steps may be executed in parallel. Furthermore, the steps may be performed actively or passively. For example, some steps may be performed using polling or be interrupt driven. By way of an example, determination steps may not have a processor process an instruction unless an interrupt is received to signify that condition exists. As another example, determinations may be performed by performing a test, such as checking a data value to test whether the value is consistent with the tested condition.

Turning to FIG. 2, the process (200) generates predicted net promotor scores that may be used to improve operations of a call center. The process (200) predicts scores using hierarchical attention and may execute as part of a server application on a server.

In Step 202, features are extracted. In one embodiment, the feature generator (225) extracts the word features (228), the positioning features (245), the participant embedding features (248), and the metadata (255) from the transcripts (222).

The word features (228) may include word vectors for each of the words in one of the transcripts. In one embodiment, a word to vector algorithm (e.g., word2vec) is used by the feature generator (225) to convert the words from a transcript to word vectors (referred to as word features or word embeddings). In one embodiment, word to vector algorithm uses a neural network model to learn word associations from a large corpus of text. Once trained, a word to vector model can detect synonymous words or suggest additional words for a partial sentence. Each distinct word is represented with a particular list of numbers called a vector (also called a word embedding). The vectors are learned such that a simple mathematical function (e.g., the cosine similarity between the vectors) indicates the level of semantic similarity between the words represented by those vectors.

In one embodiment, the word to vector model is a shallow, two-layer neural network that is trained to reconstruct linguistic contexts of words. A word to vector model takes, as its input, a large corpus of text and produces a vector space, of several hundred dimensions, with each unique word in the corpus being assigned a corresponding vector in the space. Word vectors are positioned in the vector space such that words that share common contexts in the corpus are located close to one another in the space.

Word to vector models may utilize either a continuous bag-of-words (CBOW) architecture or a continuous skip-gram architecture. In the continuous bag-of-words architecture, the model predicts the current word from a window of surrounding context words. The order of context words does not influence prediction (bag-of-words assumption). In the continuous skip-gram architecture, the model uses the current word to predict the surrounding window of context words. The skip-gram architecture weighs nearby context words more heavily than more distant context words. Continuous bag of words is faster while skip-gram is more accurate with infrequent words.

In Step 204, word encoder vectors are formed. In one embodiment, a word encoder vector is formed by multiplying weights of a word encoder layer to one or more word features. In one embodiment, the word encoder layer (230) uses a bidirectional recurrent neural network to generate a word encoder vector from a set of word vectors. The set of word vectors used is a subset of the word features (228) that forms an utterance from one of the transcripts (222).

In Step 206, the sentence vectors (238) are formed. In one embodiment, a sentence vector is formed by multiplying weights of the word attention layer (235) to the word encoder vectors (232) for an utterance from one of the transcripts (222).

In Step 208, the utterance encoder vectors (242) are formed. In one embodiment, an utterance encoder vector is formed by multiplying weights of the utterance encoder layer (240) to one of sentence vectors (238) that represents an utterance from one of the transcripts (222). In one embodiment, the utterance encoder layer (240) includes a bidirectional recurrent neural network to generate an utterance encoder vector from a sentence vector.

In Step 210, the conversation vectors (252) are formed. In one embodiment, a conversation vector (representing an entire conversation between a customer and an expert) is formed by multiplying weights of an utterance attention layer (250) to utterance encoder vectors (242) combined with the positioning features (245) and the participant embedding features (248). The combination of the utterance encoder vectors (242) with the positioning features (245) and the participant embedding features (248) is unconventional and not normally performed by machine learning systems. In one embodiment, the positioning features (245) and the participant embedding features (248) are combined with the utterance encoder vectors (242) by appending the positioning features (245) and the participant embedding features (248) to corresponding ones of the utterance encoder vectors (242).

In one embodiment, the positioning features (245) identify the start position and end position of utterances in the transcripts (222). An utterance (e.g., a sentence) from a transcript includes the words spoken by an agent or an expert during the conversation that is recorded to the transcript. The positioning features for an utterance identify the start position (i.e., the start time) of the utterance and the end position (i.e., the stop time) of the utterance relative to the start and end of the conversation. The start of a conversation may be identified as "0" and the end of a conversation may be identified as "1" with the positioning features occurring as rational numbers (e.g., floating-point values) between 0 and 1.

In one embodiment the participant embedding features (248) identify the speakers of the words in the transcripts (222). The identity of the speaker may be tagged in the transcripts to identify the customer or the expert as the speaker of words and utterances during a conversation. In one embodiment the participant embedding features (248) are categorical values with one value (e.g., "0") identifying a customer as the speaker and a second value (e.g., "1") identifying an expert as the speaker.

In Step 212, predicted net promoter scores are generated. In one embodiment, a predicted net promoter score (260) is generated by multiplying weights of an output layer to a conversation vector combined with the metadata (255).

In one embodiment, the metadata (255) is combined with a conversation vector by appending the metadata (255) to the conversation vector. The combination of the conversation vectors (252) with the metadata (255) is unconventional and not normally performed by machine learning systems. In one embodiment, the metadata (255) includes values for a total duration, a non-talk time count, a non-talk time duration, an overtalk count, an overtalk duration, and a talk duration.

The total duration identifies the total time for a conversation. The total duration may be stored as a floating-point number of milliseconds, an integer number of minutes, etc. of the conversation.

The non-talk time count identifies the number of times during the conversation when no one was speaking. The non-talk time count may be stored as an integer or floating-point value.

The non-talk time duration identifies the amount of time during which no one was speaking. The non-talk time duration may be stored as a floating-point number of milliseconds, an integer number of minutes, etc.

The overtalk count identifies the number of times during the conversation when both parties are speaking. The overtalk count identifies may be stored as an integer or floating-point value.

The overtalk duration identifies the amount of time during which both parties are speaking. The overtalk duration may be stored as a floating-point number of milliseconds, an integer number of minutes, etc.

The talk duration identifies the amount of time during which at least one party is speaking. The talk duration may be stored as a floating-point number of milliseconds, an integer number of minutes, etc.

The output layer (258) may include fully connected layers and softmax activation layers. For example, a fully connected layer with softmax activation may convert a conversation vector combined with metadata to a three-element score vector having floating-point values representing the categories of "promoter", "neutral", or a "detractor". The three-element score vector may then be translated to a numeric value from 0 to 10 for the predicted net promoter score.

When the "detractor" category has the highest value from the three-element score vector, the value of the element for the "detractor" category, which ranges from 0 to 1, is interpolated to a net promotor score ranging from 6 to 0. A higher detractor classification (a value closer to 1) results in a lower net promotor score (closer 0) and vice versa.

When the "neutral" category has the highest value from the three-element score vector, the value of the element for the "neutral" category, which ranges from 0 to 1, is interpolated to a net promotor score ranging from 7 to 8. A higher neutral classification (a value closer to 1) results in a higher net promotor score (closer 8) and vice versa.

When the "promoter" category has the highest value from the three-element score vector, the value of the element for the "promoter" category, which ranges from 0 to 1, is interpolated to a net promotor score ranging from 9 to 10. A higher neutral classification (a value closer to 1) results in a higher net promotor score (closer 10) and vice versa.

In one embodiment, the output layer may include a single fully connected layer with softmax activation that outputs an eleven-element vector that categorically represent net promoter scores 0 through 10. A conversation vector and corresponding metadata may be used as input, and the eleven-element vector is an output that identifies the numerical value of the predicted net promoter score. The element of the eleven-element vector having the highest value may identify the predicted net promoter score. For example, the vector "[0.044, 0.002, 0.034, 0.082, 0.031, 0.010, 0.015, 0.014, 0.638, 0.041, 0.087]" has a zeroth element of 0.044, an eighth element of 0.638 (which has the highest relative value), and represents a net promotor score of "8".

In Step 214 predicted net promoter scores are presented. In one embodiment, a predicted net promoter score is presented in a list of conversations. In one embodiment, the predicted net promoter score is presented by injecting the predicted net promoter score into a report identifying a participant of the conversation. For example, the list of conversations may include a table with rows for conversation. One of the columns may be the predicted net promoter score for the conversations. For each conversation a participant identifier may identify the expert that participated in the conversation.

In one embodiment, the list of conversations may be presented with highlighting to identify conversations that are below a threshold value. For example, when a predicted net promoter score is neutral or detractor (e.g., below 8), the row or cell with the low predicted net promoter score may be highlighted and notifications may be sent to the expert and the manager of the expert to discuss issues from the conversation.

In one embodiment, a participant identifier linked to the conversation is identifying when the predicted net promoter score meets a threshold. A notification identifying the participant identifier may be generated to improve operation of a call center. For example, the notification may indicate to the expert that participated in the call that additional training will be provided by to the expert to prevent low promoter scores and improve the operations of the call center. In one embodiment, the notification may indicate that the expert that the is to be removed from the call center.

Figure 3:
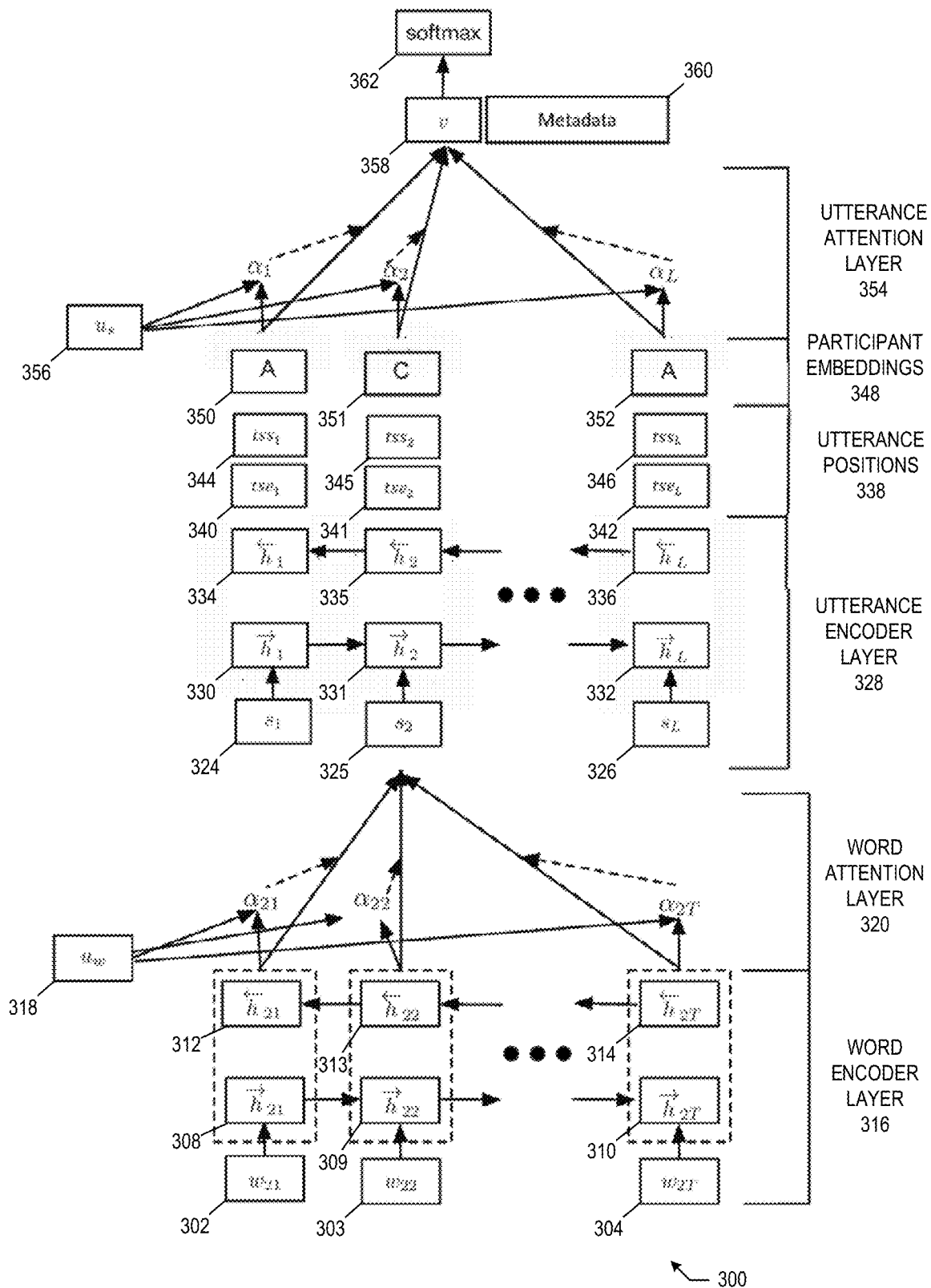
Figure 4:
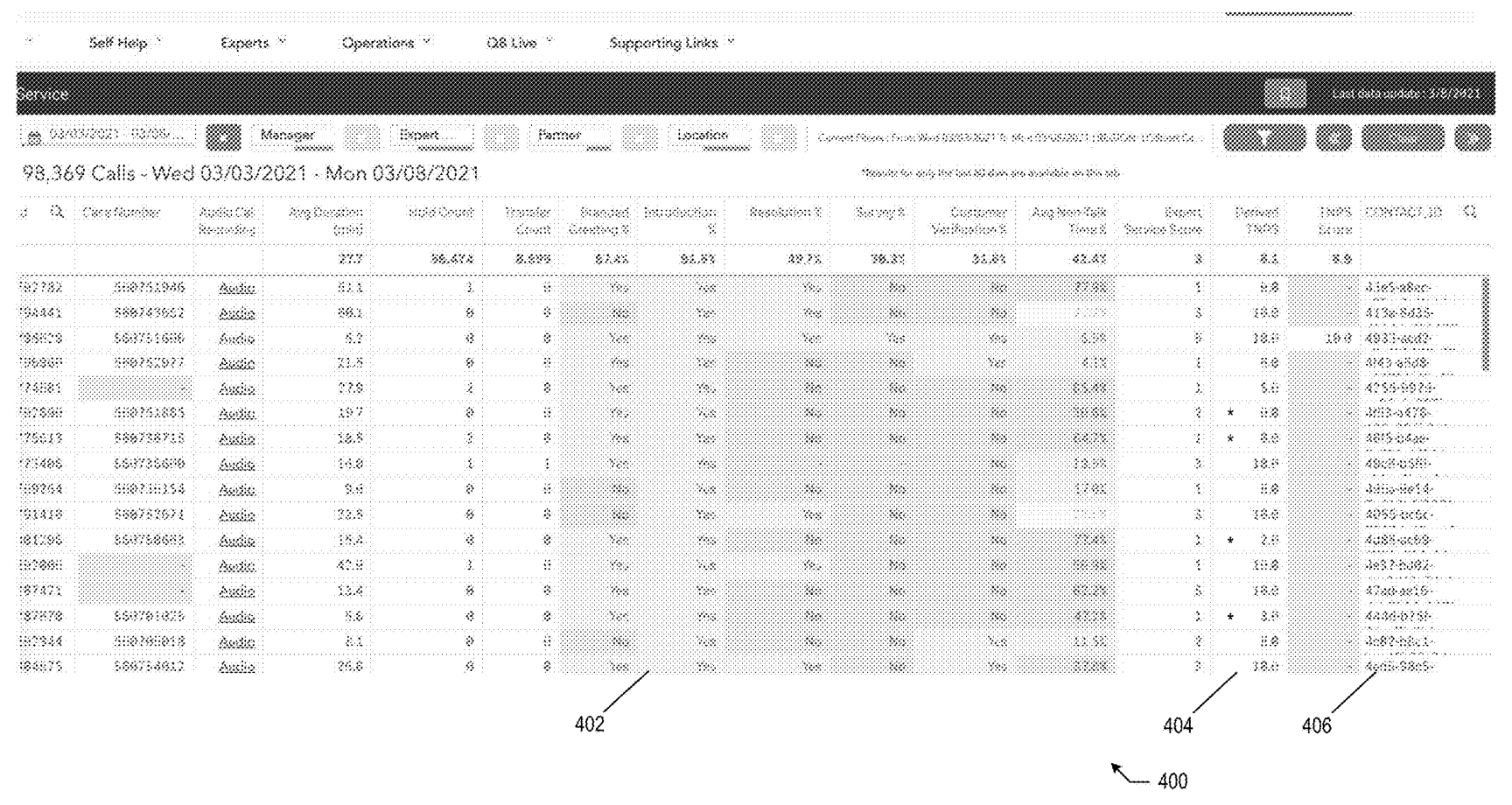

FIGS. 3 and 4 show examples of systems and sequences that generate and use predicted net promotor scores to improve operations of a call center. FIG. 3 shows an example of a hierarchical attention model. FIG. 4 shows an example of presenting predicted net promotor scores. The embodiments shown in FIGS. 3 and 4 may be combined and may include or be included within the features and embodiments described in the other figures of the application. The features and elements of FIGS. 3 and 4 are, individually and as a combination, improvements to machine learning technology and computing systems. The various features, elements, widgets, components, and interfaces shown in FIGS. 3 and 4 may be omitted, repeated, combined, and/or altered as shown. Accordingly, the scope of the present disclosure should not be considered limited to the specific arrangements shown in FIGS. 3 and 4.

Turning to FIG. 3, the hierarchical attention model (300) generates a score vector from the word embeddings (302), (303), and (304). The word embeddings (302), (303), and (304) may each be 200 element vectors that represent the words in a transcript. A word vector is generated for each word in a transcript. The word embeddings (302), (303), and (304) are input to the word encoder layer (316).

The word encoder layer (316) includes a first directional layer that generates the first directional word vectors (308), (309), and (310). A second directional layer, of the word encoder layer (316), generates the second directional word vectors (312), (313), and (314) using the first directional word vectors (308), (309), and (310). The first and second directional layers may have nodes for each word in a sentence or utterance. For example, the first and second directional layers of the word encoder layer (316) may have (100) nodes each to process the first (100) words in a sentence or utterance.

The word attention layer (320) combines the attention vector (318) with the outputs of the word encoder layer (316) (e.g., the second directional word vectors (312), (313), and (314)) to form the sentence vector (325). The sentence vector (325) represents one sentence (or utterance) from a transcript of a conversation and may be an element vector (200).

The utterance encoder layer (328) includes a first directional layer that generates the first directional utterance vectors (330), (331), and (332) from the vectors (324), (325), and (326) output from the word attention layer (320). A second directional layer, of the utterance encoder layer (328), generates the second directional utterance vectors (334), (335), and (336) using the first directional utterance vectors (330), (331), and (332). The first and second directional layers may have nodes for each sentence (or utterance) of a conversation and corresponding transcript. As an example, the first and second directional layers of the utterance encoder layer (328) may each have 50 nodes to process the first 50 sentences of a conversation.

The utterance positions (338) are appended to the output of the utterance encoder layer (e.g., the second directional utterance vectors (334), (335), and (336)). The utterance positions (338) include the end positions (340), (341), and (342) and the start positions (344), (345), and (346). The end positions (340), (341), and (342) identify the end position of utterances in a conversation. The start positions (344), (345), and (346) identify the start positions of utterances within a conversation. The start and end positions may be recorded as floating-point values for the number of milliseconds since the beginning of the conversation. The start and end position values may be divided by the duration of the conversation to generate values between 0 and 1, which are appended to the output of the utterance encoder layer (328).

The participant embeddings (348) are also appended to the output of the utterance encoder layer (e.g., the second directional utterance vectors (334), (335), and (336)). The participant embeddings (348) include the individual participant embeddings (350), (351), and (352). Each participant embedding may be a four element one hot vector that categorically identifies the speakers of a sentence. The participant embeddings (348) may include four categories to identify that "no one is speaking", the "customer is speaking", the "expert is speaking", and "both are speaking" during the utterance.

The utterance attention layer (354) combines the attention vector (356) with the outputs of the utterance encoder layer (328) (e.g., the second directional utterance vectors (334), (335), and (336)), the utterance positions (338), and the participant embeddings (348) to form the conversation vector (358). The conversation vector (358) represents the conversation from a transcript and may be an element vector (200).

The conversation vector (358) is combined with the metadata (360) and input to a fully connected layer with softmax activation (362). The metadata (360) includes the floating point values for total duration, a non-talk time count, a non-talk time duration, an overtalk count, an overtalk duration, and a talk duration. The output from the softmax activation (362) is a three-element score vector with elements for the categories of "promoter", "neutral", and "detractor" to predict if the customer that participated in the conversation will be a promoter, a detractor, or neutral based on the interaction with the expert.

Turning to FIG. 4, the graphical user interface (400) presents a list of predicted net promoter scores. The graphical user interface (400) displays a web page from a server that includes the table (402). The rows of the table (402) identify a conversation between an expert and a customer. The table (402) includes the column (404), which displays a list of derived transactional net promoter scores (also referred to as predicted net promoter scores).

For each conversation, a transcript is analyzed by a hierarchical attention model to generate derived transactional net promoter score. The derived transactional net promoter scores that are below a threshold (e.g., below a score of 5) are highlighted by including an asterisk in the cell with the derived transactional net promoter score.

The column (406) includes a list of participant identifiers. The participant identifier identifies the experts that participated in the conversation.

Notifications or other remedial actions may be triggered by derived transactional net promoter scores that are below the threshold. For example, an email may be sent to the expert, after generating the derived transactional net promoter score, indicating that the derived transactional net promoter score was below a threshold.

Embodiments of the invention may be implemented on a computing system. Any combination of a mobile, a desktop, a server, a router, a switch, an embedded device, or other types of hardware may be used. For example, as shown in FIG. 5A, the computing system (500) may include one or more computer processor(s) (502), non-persistent storage (504) (e.g., volatile memory, such as a random access memory (RAM), cache memory), persistent storage (506) (e.g., a hard disk, an optical drive such as a compact disk (CD) drive or a digital versatile disk (DVD) drive, a flash memory, etc.), a communication interface (512) (e.g., Bluetooth interface, infrared interface, network interface, optical interface, etc.), and numerous other elements and functionalities.

The computer processor(s) (502) may be an integrated circuit for processing instructions. For example, the computer processor(s) (502) may be one or more cores or micro-cores of a processor. The computing system (500) may also include one or more input device(s) (510), such as a touchscreen, a keyboard, a mouse, a microphone, a touchpad, an electronic pen, or any other type of input device.

The communication interface (512) may include an integrated circuit for connecting the computing system (500) to a network (not shown) (e.g., a local area network (LAN), a wide area network (WAN) such as the Internet, a mobile network, or any other type of network) and/or to another device, such as another computing device.

Further, the computing system (500) may include one or more output device(s) (508), such as a screen (e.g., a liquid crystal display (LCD), a plasma display, a touchscreen, a cathode ray tube (CRT) monitor, a projector, or other display device), a printer, an external storage, or any other output device. One or more of the output device(s) (508) may be the same or different from the input device(s) (510). The input and output device(s) (510 and (508)) may be locally or remotely connected to the computer processor(s) (502), non-persistent storage (504), and persistent storage (506). Many different types of computing systems exist, and the aforementioned input and output device(s) (510 and (508)) may take other forms.

Software instructions in the form of computer readable program code to perform embodiments of the invention may be stored, in whole or in part, temporarily or permanently, on a non-transitory computer readable medium such as a CD, a DVD, a storage device, a diskette, a tape, flash memory, physical memory, or any other computer readable storage medium. Specifically, the software instructions may correspond to computer readable program code that, when executed by a processor(s), is configured to perform one or more embodiments of the invention.

The computing system (500) in FIG. 5A may be connected to or be a part of a network. For example, as shown in FIG. 5B, the network (520) may include multiple nodes (e.g., node X (522), node Y (524)). Each node may correspond to a computing system, such as the computing system (500) shown in FIG. 5A, or a group of nodes combined may correspond to the computing system (500) shown in FIG. 5A. By way of an example, embodiments of the invention may be implemented on a node of a distributed system that is connected to other nodes. By way of another example, embodiments of the invention may be implemented on a distributed computing system having multiple nodes, where each portion of the invention may be located on a different node within the distributed computing system. Further, one or more elements of the aforementioned computing system (500) may be located at a remote location and connected to the other elements over a network.

Figure 5B:
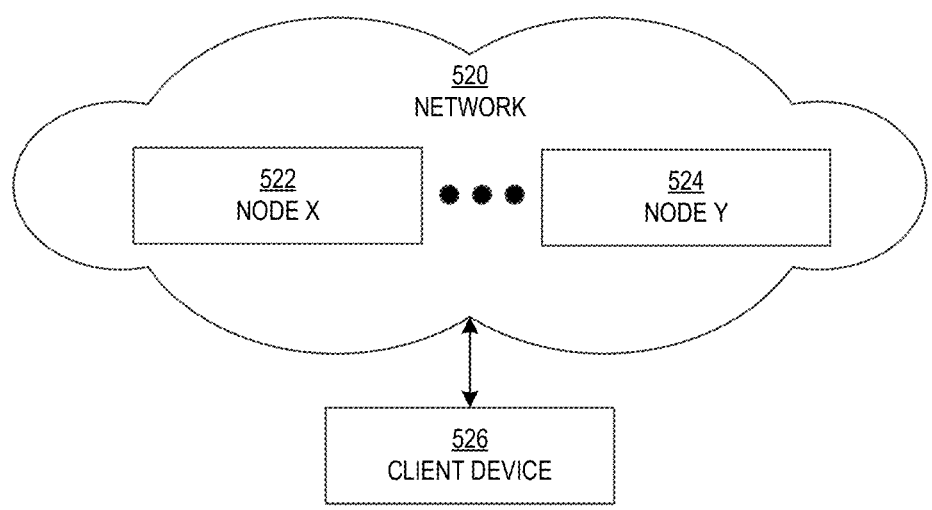

Although not shown in FIG. 5B, the node may correspond to a blade in a server chassis that is connected to other nodes via a backplane. By way of another example, the node may correspond to a server in a data center. By way of another example, the node may correspond to a computer processor or micro-core of a computer processor with shared memory and/or resources.

The nodes (e.g., node X (522), node Y (524)) in the network (520) may be configured to provide services for a client device (526). For example, the nodes may be part of a cloud computing system. The nodes may include functionality to receive requests from the client device (526) and transmit responses to the client device (526). The client device (526) may be a computing system, such as the computing system (500) shown in FIG. 5A. Further, the client device (526) may include and/or perform all or a portion of one or more embodiments of the invention.

The computing system (500) or group of computing systems described in FIGS. 5A and 5B may include functionality to perform a variety of operations disclosed herein. For example, the computing system(s) may perform communication between processes on the same or different system. A variety of mechanisms, employing some form of active or passive communication, may facilitate the exchange of data between processes on the same device. Examples representative of these inter-process communications include, but are not limited to, the implementation of a file, a signal, a socket, a message queue, a pipeline, a semaphore, shared memory, message passing, and a memory-mapped file. Further details pertaining to a couple of these non-limiting examples are provided below.

Based on the client-server networking model, sockets may serve as interfaces or communication channel endpoints enabling bidirectional data transfer between processes on the same device. Foremost, following the client-server networking model, a server process (e.g., a process that provides data) may create a first socket object. Next, the server process binds the first socket object, thereby associating the first socket object with a unique name and/or address. After creating and binding the first socket object, the server process then waits and listens for incoming connection requests from one or more client processes (e.g., processes that seek data). At this point, when a client process wishes to obtain data from a server process, the client process starts by creating a second socket object. The client process then proceeds to generate a connection request that includes at least the second socket object and the unique name and/or address associated with the first socket object. The client process then transmits the connection request to the server process. Depending on availability, the server process may accept the connection request, establishing a communication channel with the client process, or the server process, busy in handling other operations, may queue the connection request in a buffer until server process is ready. An established connection informs the client process that communications may commence. In response, the client process may generate a data request specifying the data that the client process wishes to obtain. The data request is subsequently transmitted to the server process. Upon receiving the data request, the server process analyzes the request and gathers the requested data. Finally, the server process then generates a reply including at least the requested data and transmits the reply to the client process. The data may be transferred, more commonly, as datagrams or a stream of characters (e.g., bytes).

Shared memory refers to the allocation of virtual memory space in order to substantiate a mechanism for which data may be communicated and/or accessed by multiple processes. In implementing shared memory, an initializing process first creates a shareable segment in persistent or non-persistent storage. Post creation, the initializing process then mounts the shareable segment, subsequently mapping the shareable segment into the address space associated with the initializing process. Following the mounting, the initializing process proceeds to identify and grant access permission to one or more authorized processes that may also write and read data to and from the shareable segment. Changes made to the data in the shareable segment by one process may immediately affect other processes, which are also linked to the shareable segment. Further, when one of the authorized processes accesses the shareable segment, the shareable segment maps to the address space of that authorized process. Often, only one authorized process may mount the shareable segment, other than the initializing process, at any given time.

Other techniques may be used to share data, such as the various data sharing techniques described in the present application, between processes without departing from the scope of the invention. The processes may be part of the same or different application and may execute on the same or different computing system.

Rather than or in addition to sharing data between processes, the computing system performing one or more embodiments of the invention may include functionality to receive data from a user. For example, in one or more embodiments, a user may submit data via a graphical user interface (GUI) on the user device. Data may be submitted via the graphical user interface by a user selecting one or more graphical user interface widgets or inserting text and other data into graphical user interface widgets using a touchpad, a keyboard, a mouse, or any other input device. In response to selecting a particular item, information regarding the particular item may be obtained from persistent or non-persistent storage by the computer processor. Upon selection of the item by the user, the contents of the obtained data regarding the particular item may be displayed on the user device in response to the user's selection.

By way of another example, a request to obtain data regarding the particular item may be sent to a server operatively connected to the user device through a network. For example, the user may select a uniform resource locator (URL) link within a web client of the user device, thereby initiating a Hypertext Transfer Protocol (HTTP) or other protocol request being sent to the network host associated with the URL. In response to the request, the server may extract the data regarding the particular selected item and send the data to the device that initiated the request. Once the user device has received the data regarding the particular item, the contents of the received data regarding the particular item may be displayed on the user device in response to the user's selection. Further to the above example, the data received from the server after selecting the URL link may provide a web page in Hyper Text Markup Language (HTML) that may be rendered by the web client and displayed on the user device.

Once data is obtained, such as by using techniques described above or from storage, the computing system, in performing one or more embodiments of the invention, may extract one or more data items from the obtained data. For example, the extraction may be performed as follows by the computing system (500) in FIG. 5A. First, the organizing pattern (e.g., grammar, schema, layout) of the data is determined, which may be based on one or more of the following: position (e.g., bit or column position, Nth token in a data stream, etc.), attribute (where the attribute is associated with one or more values), or a hierarchical/tree structure (consisting of layers of nodes at different levels of detail-such as in nested packet headers or nested document sections). Then, the raw, unprocessed stream of data symbols is parsed, in the context of the organizing pattern, into a stream (or layered structure) of tokens (where each token may have an associated token "type").

Next, extraction criteria are used to extract one or more data items from the token stream or structure, where the extraction criteria are processed according to the organizing pattern to extract one or more tokens (or nodes from a layered structure). For position-based data, the token(s) at the position(s) identified by the extraction criteria are extracted. For attribute/value-based data, the token(s) and/or node(s) associated with the attribute(s) satisfying the extraction criteria are extracted. For hierarchical/layered data, the token(s) associated with the node(s) matching the extraction criteria are extracted. The extraction criteria may be as simple as an identifier string or may be a query presented to a structured data repository (where the data repository may be organized according to a database schema or data format, such as XML).

The extracted data may be used for further processing by the computing system. For example, the computing system (500) of FIG. 5A, while performing one or more embodiments of the invention, may perform data comparison. Data comparison may be used to compare two or more data values (e.g., A, B). For example, one or more embodiments may determine whether A>B, A=B, A !=B, A<B, etc. The comparison may be performed by submitting A, B, and an opcode specifying an operation related to the comparison into an arithmetic logic unit (ALU) (i.e., circuitry that performs arithmetic and/or bitwise logical operations on the two data values). The ALU outputs the numerical result of the operation and/or one or more status flags related to the numerical result. For example, the status flags may indicate whether the numerical result is a positive number, a negative number, zero, etc. By selecting the proper opcode and then reading the numerical results and/or status flags, the comparison may be executed. For example, in order to determine if A>B, B may be subtracted from A (i.e., A−B), and the status flags may be read to determine if the result is positive (i.e., if A>B, then A−B>0). In one or more embodiments, B may be considered a threshold, and A is deemed to satisfy the threshold if A=B or if A>B, as determined using the ALU. In one or more embodiments of the invention, A and B may be vectors, and comparing A with B requires comparing the first element of vector A with the first element of vector B, the second element of vector A with the second element of vector B, etc. In one or more embodiments, if A and B are strings, the binary values of the strings may be compared.

The computing system (500) in FIG. 5A may implement and/or be connected to a data repository. For example, one type of data repository is a database. A database is a collection of information configured for ease of data retrieval, modification, re-organization, and deletion. A Database Management System (DBMS) is a software application that provides an interface for users to define, create, query, update, or administer databases.

The user, or software application, may submit a statement or query into the DBMS. Then the DBMS interprets the statement. The statement may be a select statement to request information, update statement, create statement, delete statement, etc. Moreover, the statement may include parameters that specify data, or data container (database, table, record, column, view, etc.), identifier(s), conditions (comparison operators), functions (e.g., join, full join, count, average, etc.), sort (e.g., ascending, descending), or others. The DBMS may execute the statement. For example, the DBMS may access a memory buffer, a reference or index a file for read, write, deletion, or any combination thereof, for responding to the statement. The DBMS may load the data from persistent or non-persistent storage and perform computations to respond to the query. The DBMS may return the result(s) to the user or software application.

The computing system (500) of FIG. 5A may include functionality to present raw and/or processed data, such as results of comparisons and other processing. For example, presenting data may be accomplished through various presenting methods. Specifically, data may be presented through a user interface provided by a computing device. The user interface may include a GUI that displays information on a display device, such as a computer monitor or a touchscreen on a handheld computer device. The GUI may include various GUI widgets that organize what data is shown as well as how data is presented to a user. Furthermore, the GUI may present data directly to the user, e.g., data presented as actual data values through text, or rendered by the computing device into a visual representation of the data, such as through visualizing a data model.

For example, a GUI may first obtain a notification from a software application requesting that a particular data object be presented within the GUI. Next, the GUI may determine a data object type associated with the particular data object, e.g., by obtaining data from a data attribute within the data object that identifies the data object type. Then, the GUI may determine any rules designated for displaying that data object type, e.g., rules specified by a software framework for a data object class or according to any local parameters defined by the GUI for presenting that data object type. Finally, the GUI may obtain data values from the particular data object and render a visual representation of the data values within a display device according to the designated rules for that data object type.

Data may also be presented through various audio methods. In particular, data may be rendered into an audio format and presented as sound through one or more speakers operably connected to a computing device.

Data may also be presented to a user through haptic methods. For example, haptic methods may include vibrations or other physical signals generated by the computing system. For example, data may be presented to a user using a vibration generated by a handheld computer device with a predefined duration and intensity of the vibration to communicate the data.

The above description of functions presents only a few examples of functions performed by the computing system (500) of FIG. 5A and the nodes (e.g., node X (522), node Y (524)) and/or client device (526) in FIG. 5B. Other functions may be performed using one or more embodiments of the invention.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method comprising:
   extracting, from a transcript of a conversation, a plurality of word features, a plurality of positioning features, a plurality of participant embedding features, and a plurality of metadata;
   forming a word encoder vector by multiplying weights of a word encoder layer of a trained hierarchical attention model to one or more word features of the plurality of word features, wherein the trained hierarchical attention model is trained to generate a predicted net promoter score from the transcript by:
      forming a plurality of training scores from a plurality of training transcripts using a hierarchical attention model comprising a word level model and an utterance level model, wherein the word level model comprises the word encoder layer and a word attention layer, and wherein the utterance level model comprises an utterance encoder layer and an utterance attention layer,
      comparing the plurality of training scores to a plurality of transcript labels to form a plurality of updates, and
      updating the hierarchical attention model with the plurality of updates to generate the trained hierarchical attention model;
   forming a sentence vector by multiplying weights of the word attention layer of the trained hierarchical attention model to a plurality of word encoder vectors comprising the word encoder vector;

forming an utterance encoder vector by multiplying weights of the utterance encoder layer of the trained hierarchical attention model to the sentence vector;

forming a conversation vector by multiplying weights of the utterance attention layer of the trained hierarchical attention model to a plurality of utterance encoder vectors comprising the utterance encoder vector, wherein the utterance encoder vector is formed from the sentence vector and is combined with one or more positioning features of the plurality of positioning features identifying positions of utterances in the transcript and with one or more participant embedding features of the plurality of participant embedding features;

generating the predicted net promoter score by multiplying weights of an output layer of the trained hierarchical attention model to the conversation vector combined with the plurality of metadata; and presenting the predicted net promoter score in a list of conversations comprising the conversation.

2. The method of claim 1, further comprising:
presenting the predicted net promoter score by injecting the predicted net promoter score into a report identifying a participant of the conversation.

3. The method of claim 1, further comprising:
identifying a participant identifier linked to the conversation when the predicted net promoter score meets a threshold; and generating a notification identifying the participant identifier to improve operation of a call center.

4. The method of claim 1, further comprising:
generating a prediction vector for the transcript, wherein the prediction vector comprises elements for categories of "detractor", "neutral", and "promoter"; and translating the prediction vector to the predicted net promoter score.

5. The method of claim 1, wherein the word encoder layer is a first bidirectional recurrent neural network, and, wherein the utterance encoder layer is a second bidirectional recurrent neural network.

6. The method of claim 1, wherein the plurality of positioning features comprises a positioning feature that is one of a start position of an utterance within the conversation and an end position of the utterance within the conversation.

7. The method of claim 1, wherein the plurality of participant embedding features comprise a participant embedding feature that identifies a participant of the conversation using a categorical value.

8. The method of claim 1, wherein the plurality of metadata comprises values for a total duration, a non-talk time count, a non-talk time duration, an overtalk count, an overtalk duration, and a talk duration.

9. The method of claim 1, wherein the output layer comprises a fully connected layer and a softmax activation.

10. A system comprising:
a trained hierarchical attention model, wherein the trained hierarchical attention model is trained to generate a predicted net promoter score from a transcript by:
forming a plurality of training scores from a plurality of training transcripts using a hierarchical attention model comprising a word level model and an utterance level model, wherein the word level model comprises a word encoder layer and a word attention layer, and wherein the utterance level model comprises an utterance encoder layer and an utterance attention layer, comparing the plurality of training scores to a plurality of transcript labels to form a plurality of updates, and updating the hierarchical attention model with the plurality of updates to generate the trained hierarchical attention model;

a server application, executes on one or more servers comprising the trained hierarchical attention model, and is configured for:
extracting, from the transcript of a conversation, a plurality of word features, a plurality of positioning features, a plurality of participant embedding features, and a plurality of metadata;

forming word encoder vector by multiplying weights of the word encoder layer of the trained hierarchical attention model to one or more word features of the plurality of word features;

forming a sentence vector by multiplying weights of the word attention layer of the trained hierarchical attention model to a plurality of word encoder vectors comprising the word encoder vector;

forming an utterance encoder vector by multiplying weights of the utterance encoder layer of the trained hierarchical attention model to the sentence vector;

forming a conversation vector by multiplying weights of the utterance attention layer of the trained hierarchical attention model to a plurality of utterance encoder vectors comprising the utterance encoder vector, wherein the utterance encoder vector is formed from the sentence vector and is combined with one or more positioning features of the plurality of positioning features identifying positions of utterances in the transcript and with one or more participant embedding features of the plurality of participant embedding features;

generating the predicted net promoter score by multiplying weights of an output layer of the trained hierarchical attention model to the conversation vector combined with the plurality of metadata; and presenting, to a client application, the predicted net promoter score in a list of conversations comprising the conversation.

11. The system of claim 10, further comprising:
a client device, wherein the transcript is from the conversation recorded from the client device.

12. The system of claim 10, further comprising:
a repository that receives the transcript and maintains training data.

13. The system of claim 10, wherein the server application is further configured for:
presenting the predicted net promoter score by injecting the predicted net promoter score into a report identifying a participant of the conversation.

14. The system of claim 10, wherein the server application is further configured for:
identifying a participant identifier linked to the conversation when the predicted net promoter score meets a threshold; and generating a notification identifying the participant identifier.

15. The system of claim 10, wherein the word encoder layer is a first bidirectional recurrent neural network, and, wherein the utterance encoder layer is a second bidirectional recurrent neural network.

16. The system of claim 10, wherein the plurality of positioning features comprises a positioning feature that is one of a start position of an utterance within the conversation and an end position of the utterance within the conversation.

17. The system of claim 10, wherein the plurality of participant embedding features comprise a participant embedding feature that identifies a participant of the conversation using a categorical value.

18. The system of claim 10, wherein the plurality of metadata comprises values for a total duration, a non-talk time count, a non-talk time duration, an overtalk count, an overtalk duration, and a talk duration.

19. A method comprising:
training a hierarchical attention model to generate a predicted net promoter score from a transcript of a conversation by:
    forming a plurality of training scores from a plurality of training transcripts by:
        extracting, from a training transcript of the plurality of training transcripts, a plurality of word features, a plurality of positioning features, a plurality of participant embedding features, and a plurality of metadata;
        forming a word encoder vector by multiplying weights of a word encoder layer to one or more word features of the plurality of word features;
        forming a sentence vector by multiplying weights of a word attention layer of the hierarchical attention model to a plurality of word encoder vectors comprising the word encoder vector;
        forming an utterance encoder vector by multiplying weights of an utterance encoder layer of the hierarchical attention model to the sentence vector;
        forming a conversation vector by multiplying weights of an utterance attention layer of the hierarchical attention model to a plurality of utterance encoder vectors comprising the utterance encoder vector, wherein the utterance encoder vector is formed from the sentence vector and is combined with one or more positioning features of the plurality of positioning features identifying positions of utterances in the training transcript and with one or more participant embedding features of the plurality of participant embedding features;
    generating a training score by multiplying weights of an output layer to the conversation vector combined with the plurality of metadata, wherein the plurality of training scores comprises the training score;
        comparing the plurality of training scores to a plurality of transcript labels to form a plurality of updates; and
        updating the hierarchical attention model with the plurality of updates to generate a trained hierarchical attention model;
wherein the predicted net promoter score is generated using the trained hierarchical attention model.

* * * * *